US012621633B2

(12) United States Patent
Kapale et al.

(10) Patent No.: US 12,621,633 B2
(45) Date of Patent: May 5, 2026

(54) METHOD AND SYSTEM FOR SHARING LOCATION INFORMATION IN REMOTE AMBIENT CALL

(71) Applicant: Samsung Electronics Co., Ltd., Suwon-si (KR)

(72) Inventors: Kiran Gurudev Kapale, Bangalore (IN); Basavaraj Jayawant Pattan, Bangalore (IN); Arunprasath Ramamoorthy, Bangalore (IN); Sapan Pramodkumar Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/909,655

(22) PCT Filed: Mar. 5, 2021

(86) PCT No.: PCT/KR2021/002732
§ 371 (c)(1),
(2) Date: Sep. 6, 2022

(87) PCT Pub. No.: WO2021/177772
PCT Pub. Date: Sep. 10, 2021

(65) Prior Publication Data
US 2023/0247391 A1     Aug. 3, 2023

(30) Foreign Application Priority Data

Mar. 5, 2020    (IN) ............................. 202041009574
Feb. 24, 2021   (IN) ............................. 2020 41009574

(51) Int. Cl.
*H04W 4/10*        (2009.01)
*H04W 4/029*      (2018.01)

(52) U.S. Cl.
CPC ............. *H04W 4/10* (2013.01); *H04W 4/029* (2018.02)

(58) Field of Classification Search
CPC ....... H04W 4/80; H04W 84/18; H04W 48/18; H04W 84/10; H04W 4/10; H04W 76/45;
(Continued)

(56) References Cited

U.S. PATENT DOCUMENTS

| | | | |
|---|---|---|---|
| 10,602,569 B2 * | 3/2020 | Ge ........................... | H04W 4/10 |
| 2010/0248770 A1 * | 9/2010 | Shuman ................. | H04W 4/10 455/67.11 |

(Continued)

FOREIGN PATENT DOCUMENTS

| | | |
|---|---|---|
| WO | 2013/074550 A1 | 5/2013 |
| WO | WO-2016111528 A1 * | 7/2016 |
| WO | 2018/010175 A1 | 1/2018 |

OTHER PUBLICATIONS

LTE; Mission Critical (MC) services over LTE; Part 2: Mission Critical Push to Talk (MCPTT) User Equipment (UE) Protocol conformance specification, ETSI tS 136 579-2 V14.0.0 (Oct. 2018).*
(Continued)

*Primary Examiner* — Golam Sorowar
(74) *Attorney, Agent, or Firm* — Jefferson IP Law, LLP

(57) ABSTRACT

The method includes determining that the remote ambient call is established between an MCPTT first electronic device (100) and an MCPTT second electronic device (200) and sending a floor grant message to the MCPTT second electronic device (200) wherein the floor grant message includes mandatory acknowledgment required indication set for the MCPTT second electronic device (200) to share the location information of the MCPTT second electronic device (200) with the MCPTT first electronic device (100) by an MCPTT server (300). Further, the method includes receiving a floor grant acknowledgement message with the location informa-
(Continued)

tion of the MCPTT second electronic device (200) and sharing the location information of the MCPTT second electronic device (200) with the MCPTT first electronic device (100) in the remote ambient call of the MCPTT service using a floor taken message by the MCPTT server (300).

14 Claims, 4 Drawing Sheets

(58) Field of Classification Search
CPC ... H04W 76/10; H04W 4/06; H04W 52/0229; H04W 76/14; H04W 76/38; H04W 8/005; H04W 80/06; H04W 84/12; H04W 4/02; H04W 72/30; H04W 8/186; H04W 76/40; H04W 12/02; H04W 28/22; H04L 67/02; H04L 67/56; H04L 63/0272; H04L 67/1021; H04L 67/01; H04L 67/563; H04L 67/568; H04L 61/4511; H04L 12/2803; H04L 63/029; H04L 12/2856; H04L 12/4633; H04L 2101/69; H04L 47/283; H04L 61/2514; H04L 61/2575; H04L 61/2589; H04L 61/5007; H04L 69/167

See application file for complete search history.

(56) References Cited

U.S. PATENT DOCUMENTS

| | | | | |
|---|---|---|---|---|
| 2011/0165905 | A1* | 7/2011 | Shuman | H04W 4/029 |
| | | | | 455/518 |
| 2016/0381528 | A1* | 12/2016 | Lee | H04W 4/10 |
| | | | | 455/404.1 |
| 2017/0094457 | A1* | 3/2017 | Lee | H04W 4/10 |
| 2018/0109972 | A1 | 4/2018 | Kim et al. | |
| 2018/0288827 | A1* | 10/2018 | Pattan | H04W 76/45 |
| 2020/0187294 | A1 | 6/2020 | Ge et al. | |
| 2023/0319567 | A1* | 10/2023 | Bilgin | H04W 4/10 |
| | | | | 455/411 |

OTHER PUBLICATIONS

Indian Office Action dated Jan. 2, 2022, issued in an Indian Patent Application No. 202041009574.

LTE; Mission Critical (MC) services over LTE; Part 5: Abstract test suite (ATS) (3GPP TS 36.579-5 version 14.2.0 Release 14); ETSI TS 136 579-5 V14.2.0; Apr. 2021.

LTE; MC services over LTE; Part 2: MCPTT UE Protocol conformance specification (3GPP TS 36.579-2 version 14.5.0 Release 14), ETSI TS 136 579-2 V14.5.0 (Jan. 2020), Jan. 17, 2020.

3GPP; TSG CT; MCPTT call control; Protocol specification (Release 16), 3GPP TS 24.379 V16.3.0 (Dec. 2019), Dec. 19, 2019.

3GPP; TSG CT; MCPTT media plane control; Protocol specification (Release 16), 3GPP TS 24.380 V16 .4.0 (Dec. 2019), Dec. 19, 2019.

3GPP; TSG CT; MCS configuration management; Protocol specification (Release 16), 3GPP TS 24.484 V16.4.0 (Dec. 2019), Dec. 20, 2019.

Extended European Search Report dated Jul. 17, 2023, issued in a European Patent Application No. 21763558.0.

3GPP; TSG SSA; Functional architecture and information flows to support Mission Critical Push to talk (MCPTT); Stage 2 (Release 17), 3GPP TS 23.379 V17.1.0 (Dec. 2019), Dec. 22, 2019, pp. 160-167, 201, 203-204.

Japanese Office Action dated Jan. 7, 2025, issued in Japanese Application No. 2022-553173.

Korean Office Action dated May 1, 2025, issued in Korean Application No. 10-2022-7034754.

Korean Notice of Allowance dated Jul. 11, 2025, issued in Korean Application No. 10-2022-7034754.

European Office Action dated May 2, 2025, issued in European Application No. 21763558.0.

* cited by examiner

[Fig. 1]
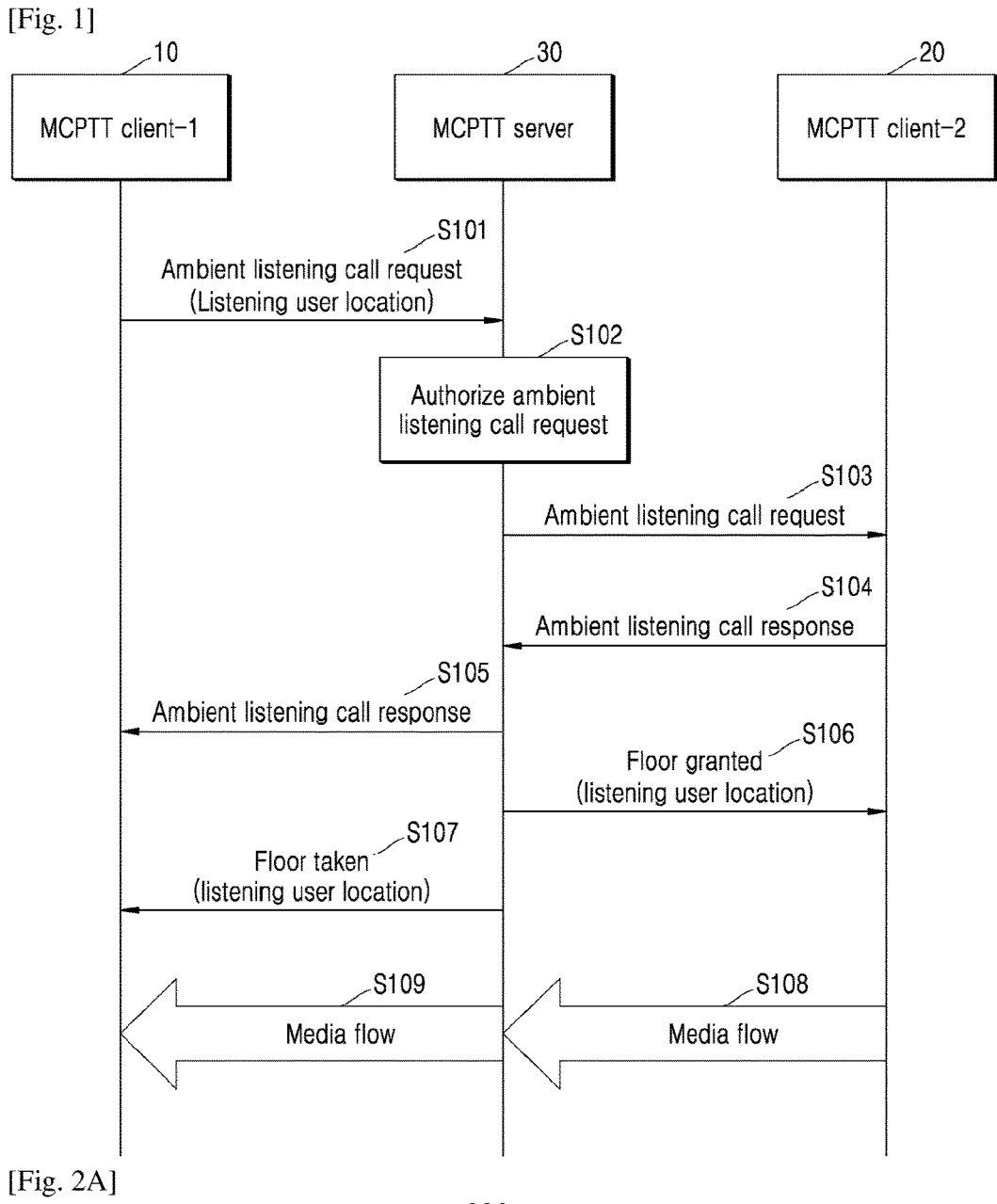
[Fig. 2A]

[Fig. 2B]
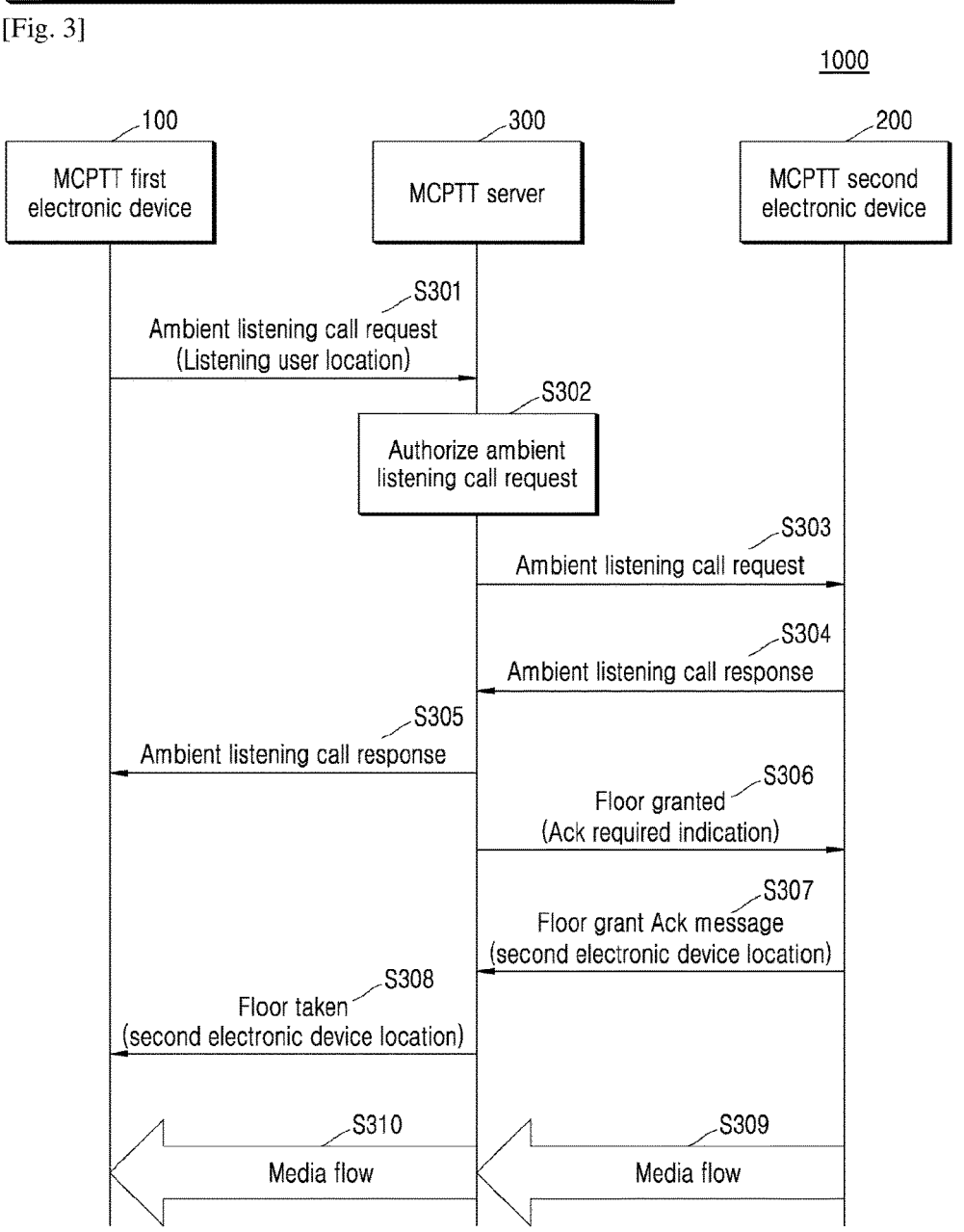

```
      ┌──────────────┐        ┌──────────────┐        ┌──────────────┐
      │    100       │        │    300       │        │    200       │
      │ MCPTT first  │        │ MCPTT server │        │ MCPTT second │
      │ electronic   │        │              │        │ electronic   │
      │   device     │        │              │        │   device     │
      └──────────────┘        └──────────────┘        └──────────────┘
```

S401
Ambient listening call request

S402
Authorize ambient
listening call request

S403
Ambient listening call request

S404
Ambient listening call response
(with location information)

S405
Ambient listening call response
(with location information)

S406
Floor granted

S407
Floor taken

S409
Media flow

S408
Media flow

[Fig. 5]

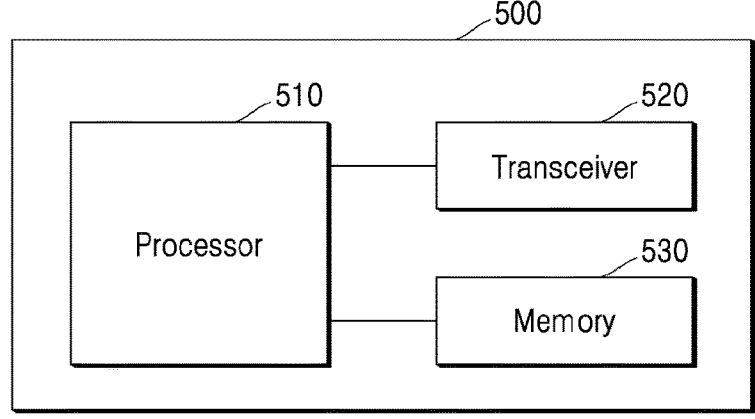

500

510
Processor

520
Transceiver

530
Memory

[Fig. 6]
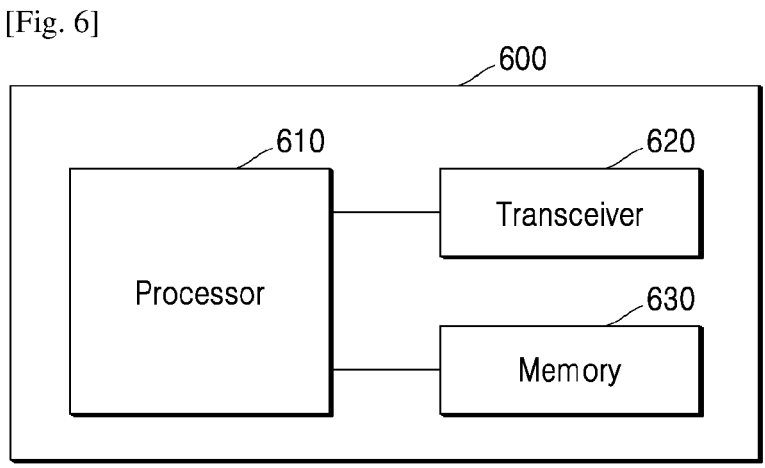

METHOD AND SYSTEM FOR SHARING LOCATION INFORMATION IN REMOTE AMBIENT CALL

TECHNICAL FIELD

The present invention relates to a wireless communication, and more specifically related to a method and system for sharing location information in a remote ambient call of a Mission-Critical Push-To-Talk (MCPTT) service.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IOT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

With continuous growth and development in telecommunication industry, ambient listening calls have become quite popular nowadays. The ambient listening call can be initiated by an authorized MCPTT user who wants to be listened by another authorized MCPTT user or can be initiated by an authorized MCPTT user who wants to listen another MCPTT user. Furthermore, a role of an MCPTT client/user in the ambient listening call is, one of:

i. Listening MCPTT user: The MCPTT user in the ambient listening call who receives a media transmission from a listened-to MCPTT user; or
   ii. Listened-to MCPTT user. The MCPTT user in the ambient listening call who is being listened to, may or may not be aware of being listened to depending on a type of the ambient listening call.

Furthermore, the type of the ambient listening call from a perspective of a relationship of an initiator of the ambient listening call to the MCPTT user being listened to. The two types of the ambient listening call are:

i. Remote-init (remote ambient call): Indicating that the listening MCPTT user has initiated the call; and
   ii. Local-init (local ambient call): Indicating that the listened-to MCPTT user has initiated the call.

Such ambient listening calls usually involve several participants communicating among themselves where the listen-to MCPTT user will not be aware of an ongoing call. In an example, remote calls and ambient calls-based communication are used in the case of Mission Critical Services/MCPTT service (agencies providing public safety services: police services, fire services, and ambulance services, etc.) as well.

As specified in 3GPP TS 23.379 V17.1.0, the MCPTT service provides location information about a current talking user to all receiving MCPTT users. In the case of the remote ambient call, no procedure is defined in an existing method to share the location information of the listened-to MCPTT user to the listening MCPTT user. FIG. 1 is a sequence diagram illustrating an existing method for initiating a remote ambient call in an MCPTT service, according to an embodiment as disclosed herein.

Certain pre-conditions in the existing method for initiating the remote ambient call in the MCPTT service are given below, i. MCPTT client-1 (10) is a client of an authorized user who is authorized to invoke a remotely initiated ambient listening call to be set up at requested MCPTT client-2 (20).
   ii. The MCPTT client-1 (10) is the "listening MCPTT user", and the MCPTT client-2 (20) is the "listened-to MCPTT user (talker)".

At step S101, the MCPTT client-1 (10) initiates the remotely initiated ambient listening call (i.e. remote ambient call) by sending an ambient listening call request to an MCPTT server (30). The remote initiated ambient listening call type is included in the ambient listening call request. At step S102, the MCPTT server (30) performs an authorization check for the MCPTT client-1 (10) for the remotely initiated ambient listening call. If authorization fails, the MCPTT server (30) provides a failure response to the MCPTT client-1 (10). At step S103, the MCPTT server (30) sends an ambient listening call request to the MCPTT client-2 (20).

At step S104, the MCPTT client-2 (20) returns an ambient listening call response to the MCPTT server (30). At step S105, the MCPTT server (30) provides the ambient listening call response to the MCPTT client-1 (10) and indicating whether a call is set up successfully or not along with the location information received from the MCPTT client-2 (20). At step S106, a floor control server of the MCPTT server (30) then sends a floor granted message to the MCPTT client-2 (20) according to an ambient listening type received in step S101. At step S107, the floor control server of the MCPTT server (30) sends a floor taken to the MCPTT client-1 (10). At step S108-S109, after receiving the floor granted message at the MCPTT client-2 (20), a media is transmitted from the MCPTT client-2 (20) to the MCPTT client-1 (10).

Furthermore, in the existing system, there is no standard way of sharing the location information of the listened-to MCPTT user to the listening MCPTT user in the remote ambient call. Different MCPTT service providers provide their own mechanism to share the location information of the listened-to MCPTT user who has received the remote ambient call. As a result, it is difficult to achieve a standardized unique procedure if all the MCPTT service providers have their own implementations/procedures and can cause interoperability issues. Thus, it is desired to at least provide a useful alternative for sharing the location information of the listened-to MCPTT user to the listening MCPTT user in the remote ambient call.

DISCLOSURE OF INVENTION

Solution to Problem

The principal object of the embodiments herein is to provide a method for sharing location information in a remote ambient call of an MCPTT service by providing a standard procedure of sharing the location information of a listened-to MCPTT user to a listening MCPTT user in the remote ambient call. The standard procedure of sharing the location information rule out interoperability issues between different MCPTT service providers.

Another object of the embodiment herein is to add an acknowledgement required indication in a floor grant message. So that the listened-to MCPTT user can share the location information with the listening MCPTT user in the remote ambient call.

Another object of the embodiment herein is to add a location field in a floor grant acknowledgement message, where the location field contains the location information of the listened-to MCPTT user (floor granted user). The location field may be omitted when the location information of the listened-to MCPTT user is not allowed by the listened-to MCPTT user's MCPTT profile, or alternatively may be included with the location field set to '0'.

Another object of the embodiment herein is to add a location field in a call control acknowledgement message for a pre-established session based ambient listening call, where the location field contains the location information of the listened-to MCPTT user (e.g. floor is being granted to a user). The location field may be omitted when the location information of the listened-to MCPTT user is not allowed by the listened-to MCPTT user's MCPTT profile, or alternatively may be included with the location field set to '0'.

Accordingly, the embodiments herein provide a method for sharing location information in a remote ambient call of an MCPTT service. The method includes determining, by an MCPTT server, that the remote ambient call is established between an MCPTT first electronic device and an MCPTT second electronic device. Further, the method includes sending, by the MCPTT server, a floor grant message with a mandatory acknowledgment required indication set for the MCPTT second electronic device to share the location information of the MCPTT second electronic device with the MCPTT first electronic device. Further, the method includes receiving, by the MCPTT server, a floor grant acknowledgement message with the location information of the MCPTT second electronic device. Further, the method includes sharing, by the MCPTT server, the location information of the MCPTT second electronic device with the MCPTT first electronic device in a floor taken message.

In an embodiment, the method further includes receiving, by the server, a media transmission from the MCPTT second electronic device. Further, the method includes sending, by the server, the media transmission to the MCPTT first electronic device.

In an embodiment, the method includes receiving, by the MCPTT server, a remote ambient listening call request from the MCPTT first electronic device to initiate a remotely initiated ambient listening call. Further, the method includes determining, by the MCPTT server, whether authentication of a user of the MCPTT first electronic device for the remotely initiated ambient listening call is successful. Further, the method includes sending a failure response to the MCPTT first electronic device in response to determining that the authentication of the user of the MCPTT first electronic device for the remotely initiated ambient listening call is not successful. Further, the method includes sending the remote ambient listening call request to the MCPTT second electronic device to establish the remote ambient call between the MCPTT first electronic device and the MCPTT second electronic device.

In an embodiment, the floor grant message comprises at least one of a timer value for which the MCPTT second electronic device is allowed to transmit in a duration field, Synchronization Source (SSRC) of granted floor participant field, a granted level of priority in a floor priority field, a track info field, a floor indicator field, and a first bit in a subtype of the floor grant message is set to one when a call is the remotely initiated ambient listening call.

In an embodiment, the track info field contains the path a floor control message has been routed along with the priority and the queuing capability of the MCPTT client and is included when an MCPTT call involves a non-controlling function.

In an embodiment, the floor indicator field contains additional information about a received floor control message.

In an embodiment, the MCPTT server initiates a floor granted timer when the floor grant message is originated for the MCPTT second electronic device for which the floor is granted and sets a floor granted counter value to one.

In an embodiment, the MCPTT server sends the floor taken message to the MCPTT first electronic device with location information of the MCPTT second electronic device after receiving the location information in floor acknowledgment message from MCPTT second electronic device.

In an embodiment, the MCPTT server initiates an end of RTP media timer for the MCPTT second electronic device for which the floor is granted and configures a general state to floor taken state.

In an embodiment, the floor grant acknowledgement message comprises at least one of a source field, a message type field, a track info field and a location field.

In an embodiment, the message type field is set to one, the source field is set to zero, and add the location information of the MCPTT second electronic device in the location field when a call is remotely initiated ambient listening call and an MCPTT profile of the MCPTT second electronic device allows to send the location information of the MCPTT second electronic device with the MCPTT first electronic device. Where a first bit in a subtype of the floor grant message is set to one.

In an embodiment, the method includes receiving, by the MCPTT second electronic device, the floor grant message from the MCPTT server. Further, the method includes sending, by the MCPTT second electronic device, the floor grant acknowledgement message with the location information of the MCPTT second electronic device to the MCPTT server. Further, the method includes providing, by the MCPTT second electronic device, a floor grant notification. Further, the method includes terminating, by the MCPTT second electronic device, the end of RTP media timer, and the floor granted timer.

In an embodiment, the method includes receiving, by the MCPTT server, the remote ambient listening call request from the MCPTT first electronic device to initiate the remotely initiated ambient listening call. Further, the method includes determining, by the MCPTT server, that authentication of the user of the MCPTT first electronic device for the remotely initiated ambient listening call is successful. Further, the method includes sending, by the MCPTT server, the remote ambient listening call request to the MCPTT second electronic device to establish the remote ambient call between the MCPTT first electronic device and the MCPTT second electronic device. Further, the method includes receiving, by the MCPTT server, the location information of the MCPTT second electronic device in a connect acknowledge message from the MCPTT second electronic device, wherein the location is field is added in the connect acknowledge message. Further, the method includes sharing, by the MCPTT server, the location information of the MCPTT second electronic device to the MCPTT first electronic device.

Accordingly, the embodiments herein provide the MCPTT server for sharing the location information in the remote ambient call of the MCPTT service. The MCPTT server includes a floor controller coupled with a processor and a memory. The floor controller is configured to determine that the remote ambient call is established between the MCPTT first electronic device and the MCPTT second electronic device. Further, the floor controller is configured to send the floor grant message with mandatory acknowledgment required indication set for the MCPTT second electronic device to share the location information of the MCPTT second electronic device with the MCPTT first electronic device. Further, the floor controller is configured to receive the floor grant acknowledgement message with the location information of the MCPTT second electronic device. Further, the floor controller is configured to share the location information of the MCPTT second electronic device with the MCPTT first electronic device in the remote ambient call of the MCPTT service using the floor taken message.

Accordingly, the embodiments herein provide the MCPTT second electronic device for sharing the location information in the remote ambient call of the MCPTT service. The MCPTT second electronic device includes a floor controller coupled with a processor and a memory. The floor controller is configured to receive the floor grant message from the MCPTT server. Further, the floor controller is configured to set a message type field of the floor acknowledgement message (i.e. floor grant acknowledgement message) set to one, a source field of the floor acknowledgement message set to zero, and add a location field in the floor acknowledgement message when the call is the remotely initiated ambient listening call and an MCPTT profile of the MCPTT second electronic device allows to send the location information of the MCPTT second electronic device with the MCPTT first electronic device when the first bit in the subtype of the received floor grant message is set to one. Further, the floor controller is configured to send the floor acknowledgement message to the MCPTT server. Further, the floor controller is configured to terminate the end of RTP media timer and the floor granted timer.

The embodiment herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 is a sequence diagram illustrating an existing method for initiating a remote ambient call in an MCPTT service, according to an embodiment as disclosed herein;

FIG. 2A is a block diagram of an MCPTT server for sharing the location information in the remote ambient call of the MCPTT service, according to an embodiment as disclosed herein;

FIG. 2B is a block diagram of an MCPTT second electronic device for sharing the location information in the remote ambient call of the MCPTT service, according to an embodiment as disclosed herein;

FIG. 3 is a sequence diagram illustrating a method for sharing the location information in the remote ambient call of the MCPTT service, according to an embodiment as disclosed herein;

FIG. 4 is a sequence diagram illustrating a method for adding a location field in a call control acknowledgement message for a pre-established session based ambient listening call, according to an embodiment as disclosed herein;

FIG. 5 is a diagram illustrating a UE according to an embodiment of the present disclosure; and FIG. 6 schematically illustrates a core network entity according to embodiments of the present disclosure.

MODE FOR THE INVENTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16c. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, herein below, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

For the purposes of the present document, the terms and definitions are given in 3GPP TR 21.905 and the following apply. A term defined in the present document takes precedence over the definition of the same term, if any, in 3GPP TR 21.905.

Accordingly, the embodiments herein provide a method for sharing location information in a remote ambient call of an MCPTT service. The method includes determining, by an MCPTT server, that the remote ambient call is established between an MCPTT first electronic device and an MCPTT second electronic device. Further, the method includes sending, by the MCPTT server, a floor grant message with mandatory acknowledgment required indication set for the MCPTT second electronic device to share the location information of the MCPTT second electronic device with the MCPTT first electronic device. Further, the method includes receiving, by the MCPTT server, a floor acknowledgement message with the location information of the MCPTT second electronic device. Further, the method includes sharing, by the MCPTT server, the location information of the MCPTT second electronic device with the MCPTT first electronic device in the remote ambient call of the MCPTT service using a floor taken message.

Accordingly, the embodiments herein provide the MCPTT server for sharing location information in the remote ambient call of the MCPTT service. The MCPTT server includes a floor controller coupled with a processor and a memory. The floor controller is configured to determine that the remote ambient call is established between the MCPTT first electronic device and the MCPTT second electronic device. Further, the floor controller is configured to send the floor grant message with mandatory acknowledgment required indication set for the MCPTT second electronic device to share the location information of the MCPTT second electronic device with the MCPTT first electronic device. Further, the floor controller is configured to receive the floor acknowledgement message with the location information of the MCPTT second electronic device. Further, the floor controller is configured to share the location information of the MCPTT second electronic device with the MCPTT first electronic device in the remote ambient call of the MCPTT service using the floor taken message.

Accordingly, the embodiments herein provide the MCPTT second electronic device for sharing location information in the remote ambient call of the MCPTT service. The MCPTT second electronic device includes a floor controller coupled with a processor and a memory. The floor controller is configured to receive the floor grant message from the MCPTT server. Further, the floor controller is configured to set a message type field of the floor acknowledgement message set to one, a source field of the floor acknowledgement message set to zero, and add a location field in the floor acknowledgement message when the call is the remotely initiated ambient listening call and an MCPTT profile of the MCPTT second electronic device allows to send the location information of the MCPTT second electronic device with the MCPTT first electronic device when the first bit in the subtype of the received floor grant message is set to one. Further, the floor controller is configured to send the floor acknowledgement message to the MCPTT server. Further, the floor controller is configured to terminate the end of RTP media timer and the floor granted timer.

Unlike existing methods and systems, the proposed method provides a standard procedure for sharing the location information of a listened-to MCPTT user (i.e. MCPTT second electronic device) to a listening MCPTT user (i.e. MCPTT first electronic device) in the remote ambient call to rule out interoperability issues between different MCPTT service providers.

Unlike existing methods and systems, the proposed method allows the MCPTT sever to add an acknowledgement required indication in the floor grant message. So, that the listened-to MCPTT user can share the location information with the listening MCPTT user in the remote ambient call.

Unlike existing methods and systems, the proposed method allows the MCPTT second electronic device to add the location field in the floor acknowledgement message and the location field contains the location information of the listened-to MCPTT user (floor granted user). The location field may be omitted when the location information of the listened-to MCPTT user is not allowed by the listened-to MCPTT user's MCPTT profile, or alternatively may be included with the location field set to '0' (Not provided).

Referring now to the drawings, and more particularly to FIGS. 2A through 4, where similar reference characters denote corresponding features consistently throughout the figures, there are shown preferred embodiments.

FIG. 2A is a block diagram of an MCPTT server (300) for sharing the location information in a remote ambient call of a MCPTT service, according to an embodiment as disclosed herein. In an embodiment, the MCPTT server (300) is connected to a MCPTT first electronic device (100) and a MCPTT second electronic device (200). In an embodiment, the MCPTT server (300) includes a memory (310), a processor (320), a communicator (330), and a floor controller (340).

The memory (310) stores a mandatory acknowledgment required indication and the location information of an MCPTT second electronic device (200). Further, the memory (310) instructions to be executed by the processor (320). The memory (310) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (310) may, in some examples, be considered a non-transitory storage medium. The term "non-transitory" may indicate that the storage medium is not embodied in a carrier wave or a propagated signal. However, the term "non-transitory" should not be interpreted that the memory (310) is non-movable. In some examples, the memory (310) can be configured to store larger amounts of information than the memory (310). In certain examples, a non-transitory storage medium may store data that can, over time, change (e.g., in Random Access Memory (RAM) or cache). In an embodiment, the memory (310) can be an internal storage unit or it can be an external storage unit of the MCPTT server (300), a cloud storage, or any other type of external storage.

The processor (320) communicates with the memory (310), the communicator (330), and the floor controller (340). The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (330) is configured for communicating internally between internal hardware components and with external devices (e.g. MCPTT first electronic device (100) and MCPTT second electronic device (200)) via one or more networks. The communicator (330) includes an electronic circuit specific to a standard that enables wired or wireless communication.

In an embodiment, the floor controller (340) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the floor controller (340) receives a remote ambient listening call request from an MCPTT first electronic device (100) to initiate a remotely initiated ambient listening call. Further, the floor controller (340) determines whether authentication of a user of the MCPTT first electronic device (100) for the remotely initiated ambient listening call is successful. Further, the floor controller (340) sends a failure response to the MCPTT first electronic device (100) in response to determining that the authentication of the user of the MCPTT first electronic device (100) for the remotely initiated ambient listening call is not successful. Further, the floor controller (340) sends the remote ambient listening call request to the MCPTT second electronic device (200) to establish the remote ambient call between the MCPTT first electronic device (100) and the MCPTT second electronic device (200). Further, the floor controller (340) receives an ambient listening call response from the MCPTT second electronic device (200). Further, the floor controller (340) sends the received ambient listening call response to the MCPTT first electronic device (100), indicating whether the call is set up successfully (remote ambient call is established between the MCPTT first electronic device (100) and the MCPTT second electronic device (200)) or not.

Further, the floor controller (340) sends a floor grant message with mandatory acknowledgment required indication set for the MCPTT second electronic device (200) to share the location information of the MCPTT second electronic device (200) with the MCPTT first electronic device (100). Further, the floor controller (340) receives a floor acknowledgement message with the location information of the MCPTT second electronic device (200). Further, the floor controller (340) shares the location information of the MCPTT second electronic device (200) with the MCPTT first electronic device (100) in the remote ambient call of the MCPTT service using a floor taken message. Further, the floor controller (340) receives a media transmission from the MCPTT second electronic device (200). Further, the floor controller (340) sends the received media transmission to the MCPTT first electronic device (100). Further details are explained in the FIG. 3.

Further, the floor controller (340) receives the remote ambient listening call request from the MCPTT first electronic device (100) to initiate the remotely initiated ambient listening call. Further, the floor controller (340) determines that authentication of the user of the MCPTT first electronic device (100) for the remotely initiated ambient listening call is successful. Further, the floor controller (340) sends the remote ambient listening call request to the MCPTT second electronic device (200) to establish the remote ambient call between the MCPTT first electronic device (100) and the MCPTT second electronic device (200). Further, the floor controller (340) receives the location information of the MCPTT second electronic device (200) in a connect acknowledge message from the MCPTT second electronic device (200), where the location is field is added in the connect acknowledge message. Further, the floor controller (340) shares the location information of the MCPTT second electronic device (200) to the MCPTT first electronic device (100).

Although the FIG. 2A shows various hardware components of the MCPTT server (300) but it is to be understood that other embodiments are not limited thereon. In other embodiments, the MCPTT server (300) may include less or more number of components. Further, the labels or names of the components are used only for illustrative purpose and does not limit the scope of the invention. One or more components can be combined together to perform same or substantially similar function to share the location information in the remote ambient call of the MCPTT service.

FIG. 2B is a block diagram of the MCPTT second electronic device (200) for sharing location information in the remote ambient call of the MCPTT service, according to an embodiment as disclosed herein. The MCPTT second electronic device (200) and the MCPTT first electronic device (100) can be, for example, but not limited to a smart phone, a wearable device, an IoT device.

In an embodiment, the MCPTT second electronic device (200) includes a memory (210), a processor (220), a communicator (230), and a floor controller (240).

The memory (210) stores the mandatory acknowledgment required indication received from the MCPTT server (300) and the location information of the MCPTT second electronic device (200). Further, the memory (210) instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory (210). In certain examples, a non-transitory storage medium may store data that can, over time, change (e.g., in Random Access Memory (RAM) or cache). In an embodiment, the memory (210) can be an internal storage unit or it can be an external storage unit of the MCPTT second electronic device (200), a cloud storage, or any other type of external storage.

The processor (220) communicates with the memory (210), the communicator (230), and the floor controller (240). The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) is configured for communicating internally between internal hardware components and with external devices (e.g. MCPTT first electronic device (100) and MCPTT server (300)) via one or more networks. The communicator (230) includes an electronic circuit specific to a standard that enables wired or wireless communication.

In an embodiment, the floor controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the floor controller (240) receives the ambient listening call request from the MCPTT server (300) on successful authentications of the first MCPTT electronic device (100) at the MCPTT server (300). Further, the floor controller (240) sends the ambient listening call response to the MCPTT server (300), indicating whether the call is set up successfully or not. Further, the floor controller (240) receives the floor grant message from the MCPTT server (300). Further, the floor controller (240) determines whether a first bit in a subtype of the received floor grant message is set to one. Further, the floor controller (240) sets a message type field of the floor acknowledgement message set to one, a source field of the floor acknowledgement message set to zero, and add a location field in the floor acknowledgement message when the first bit in the subtype of the received floor grant message is set to one, the call is the remotely initiated ambient listening call and an MCPTT profile of the MCPTT second electronic device (200) allows to send the location information of the MCPTT second electronic device (200) with the MCPTT first electronic device (100). Further details is explained in the FIG. 3.

Although the FIG. 2B shows various hardware components of the MCPTT second electronic device (200) but it is to be understood that other embodiments are not limited thereon. In other embodiments, the MCPTT second electronic device (200) may include less or more number of components. Further, the labels or names of the components are used only for illustrative purpose and does not limit the scope of the invention. One or more components can be combined together to perform same or substantially similar function to share the location information in the remote ambient call of the MCPTT service.

FIG. 3 is a sequence diagram illustrating a method for sharing the location information in the remote ambient call of the MCPTT service, according to an embodiment as disclosed herein.

Certain pre-conditions in the method for sharing the location information in the remote ambient call of the MCPTT service are given below, i. The MCPTT first electronic device (100) is a client of an authorized user who is authorized to invoke the remotely initiated ambient listening call to be set up at the requested MCPTT second electronic device (200).

ii. The MCPTT first electronic device (100) is the "listening MCPTT user", and the MCPTT second electronic device (200) is the "listened-to MCPTT user (talker)".

At step S301, the MCPTT first electronic device (100) initiates the remotely initiated ambient listening call (i.e. remote ambient call) by sending an ambient listening call request to the MCPTT server (300). The remote initiated ambient listening call type is included in the ambient listening call request. At step S302, the MCPTT server (300) performs an authorization check for the MCPTT first electronic device (100) for the remotely initiated ambient listening call. If authorization fails, the MCPTT server (300) provides the failure response to the MCPTT first electronic device (100). At step S303, the MCPTT server (300) sends an ambient listening call request to the MCPTT second electronic device (200). At step S304, the MCPTT second electronic device (200) returns the ambient listening call response to the MCPTT server (300). At step S305, the MCPTT server (300) provides the ambient listening call response to the MCPTT first electronic device (100), indicating whether the call is set up successfully or not.

At step S306, a floor control server of the MCPTT server (300) then sends a floor granted message to the MCPTT second electronic device (200) according to the ambient listening type received in the step S301. The floor granted message contains an indication for the MCPTT second electronic device (200) to send a floor acknowledgement message for the received floor grant message. At step S307, the MCPTT second electronic device (200) sends the floor acknowledgement message with the location information of the MCPTT second electronic device (200) to the floor control server of the MCPTT server (300). At step S308, the floor control server of the MCPTT server (300) sends a floor taken to the MCPTT first electronic device (100) along with the received location information of the MCPTT second electronic device (200). At step S309-S310, after receiving the floor granted message at the MCPTT second electronic device (200), a media is transmitted from the MCPTT second electronic device (200) to the MCPTT first electronic device (100).

FIG. 4 is a sequence diagram illustrating a method for adding a location field in a call control acknowledgement message (connect acknowledge message) for a pre-established session based ambient listening call, according to an embodiment as disclosed herein.

Certain pre-conditions in the method for sharing the location information in the remote ambient call of the MCPTT service are given below, i. The MCPTT first electronic device (100) is a client of an authorized user who is authorized to invoke the remotely initiated ambient listening call to be set up at the requested MCPTT second electronic device (200).

ii. The MCPTT first electronic device (100) is the "listening MCPTT user", and the MCPTT second electronic device (200) is the "listened-to MCPTT user (talker)".

At step S401, the MCPTT first electronic device (100) initiates a remotely initiated ambient listening call by sending an ambient listening call request to the MCPTT server (300). The remotely initiated ambient listening call type is included. At step S402, the MCPTT server (300) performs an authorization check for the authorized user (i.e. MCPTT first electronic device (100)) for the remotely initiated ambient listening call. If authorization fails, the MCPTT server (300) provides a failure response to the MCPTT first electronic device (100). At step S403, the MCPTT server (300) sends the ambient listening call request to the MCPTT second electronic device (200). At step S404, the MCPTT second electronic device (200) returns the ambient listening call response to the MCPTT server (300) with location information included. At step S405, the MCPTT server (300) provides an ambient listening call response to the MCPTT first electronic device (100), indicating whether the call is set up successful or not along with the location information received from the MCPTT second electronic device (200). At step S406, the floor control server of the MCPTT server (300) then sends a floor granted to the MCPTT second electronic device (200) according to the ambient listening type received in the step S401. At step S407, the floor control server of the MCPTT server (300) sends a floor taken to the MCPTT first electronic device (100). At step S408-S409, after receiving the floor granted message at the MCPTT second electronic device (200), the media is transmitted from the MCPTT second electronic device (200) to the MCPTT first electronic device (100).

In an embodiment, the following information elements and procedures are required to achieve a proposed solution.

Entering 'G: Floor Taken' state: A floor control arbitration logic in the floor control server of the MCPTT server (300) are explained below.

In an embodiment, the MCPTT server (300) sends the floor granted message to the floor participant (i.e. MCPTT second electronic device (200)) to which the floor is granted. The floor granted message:

a. Includes a value of a timer T2 (stop talking) in a duration field;

b. Includes a granted priority in a floor priority field;

c. Includes a stored track info field, If the track info field associated with the floor control server state transition diagram for 'general floor control operation' is stored;

d. Includes a floor indicator field with appropriate indications, If a group call is a broadcast group call, a system call, emergency call, an imminent peril call, or a temporary group session; and e. Sets a first bit in a subtype of the floor granted message to '1' (Acknowledgment is required) as described in sub-clause 8.2.2 if the call is the ambient listening call and the ambient listening call type is remote-initiated. If the call is the ambient listening call and the ambient listening call type is remote-initiated, then the floor participant to which the floor is granted is the terminating floor participant of the call. Otherwise, the floor is granted to the participant which requested the floor.

In another embodiment, the MCPTT server (300) sends the floor taken message to all other floor participants. The floor taken message:

a. If the floor is currently granted only to one participant:

i. include the granted MCPTT user's MCPTT ID (ID of MCPTT second electronic device (200)) in the granted party's identity field, if privacy is not requested; and ii. may include functional alias of the granted MCPTT user in a functional alias field, if privacy is not requested;

b. If multi-talker is supported and the floor is currently granted to multiple participants:

i. includes the floor indicator field with a I-bit set to '1' (multi-talker);

ii. includes a list of granted users in the multi-talker group in a List of granted users field, including a new granted talker;

iii. includes a list of SSRCs of granted floor participants; and iv. may include a list of functional aliases of the granted floor participants in a list of functional aliases field;

c. Includes a message sequence number field with a message sequence number value increased by 1.

d. If the session is the broadcast group call or the ambient listening call, includes permission to request a floor field set to '0';

e. If the session is not the broadcast group call, may include the permission to request the floor field set to '1'; and f. If the group call is the broadcast group call, the system call, the emergency call, the imminent peril call, or the In another embodiment, the MCPTT second electronic device (200) provides a notification to the user indicating a type of call, if the floor indicator field is included and a B-bit is set to '1' (broadcast group call).

In another embodiment, the MCPTT second electronic device (200) stores an indication that the participant is overriding without revoke, if a G-bit in the floor indicator is set to '1' (Dual floor).

In another embodiment, the MCPTT second electronic device (200) stops an optional timer T103 (end of RTP media), if running.

In another embodiment, the MCPTT second electronic device (200) stops a timer T101 (floor request).

In another embodiment, the MCPTT second electronic device (200) enters the 'U: has permission' state.

The floor acknowledgement message (i.e. floor grant acknowledgement message): The floor acknowledgement message is used to acknowledge any floor control message that included the first bit (marked as x in the subtype) set to 1 (see sub-clause 8.2.2 of TS 3GPP 24.380). The floor acknowledgement message is only used in an on-network mode. The floor acknowledgement message is only used over a unicast bearer. Table. 1 shows the content of the floor acknowledgement message.

TABLE 1

| | | | | | S307 | | | | | |
|---|---|---|---|---|---|---|---|---|---|---|
| 0 | | | | | 1 | | | 2 | | 3 |
| 0 | 1 | 2 | 3 4 5 6 7 8 9 | 0 | 1 2 3 4 5 6 7 8 9 | 0 1 2 3 4 5 6 7 8 9 | 0 1 |
| V = 2 | | P | subtype | | PT = APP = 204 | | | Length | | |
| | | | | | SSRC of the sender | | | | | |
| | | | | | Name = MCPT | | | | | |
| | | | | | Source field | | | | | |
| | | | | | Message type filed | | | | | |
| | | | | | Track info field | | | | | |
| | | | | | Location field | | | | | | temporary group session, includes the floor indicator field with appropriate indications.

In another embodiment, the MCPTT server (300) starts a timer T1 (end of RTP media) for the participant to which the floor is granted;

In another embodiment, the MCPTT server (300) sets the general state to 'G: Floor Taken' state; and In another embodiment, the MCPTT server (300) adds the MCPTT identity of the participant to which the floor is granted to the list of currently granted talkers, if configured to support multi-talker floor control the group is configured.

Receive the floor granted message (R: floor granted): Upon receiving the floor granted message from the floor control server or a floor granted indication in a SIP 200 (OK) response in an application and signaling layer, the floor participant:

In an embodiment, the MCPTT second electronic device (200) sends the floor acknowledgement message, if the first bit in the subtype of the floor granted message is set to '1' (Acknowledgment is required) as described in sub-clause 8.2.2 of TS 3GPP 24.380. The floor acknowledgement message:

a. Includes the message type field set to '1' (floor granted);

b. Includes the source field set to '0' (the floor participant is the source);

c. Includes the location information if the call is the ambient listening call and the ambient listening call type is remote-initiated.

The subtype is coded according to table 8.2.2-1 of TS 3GPP 24.380. The length is coded as specified in sub-clause 8.1.2 of TS 3GPP 24.380. The SSRC field carries the SSRC of the source identified by the source field. The SSRC field is coded as specified in IETF RFC 3550. The Source field is coded as specified in sub-clause 8.2.3.12 of TS 3GPP 24.380. The message type field contains the floor control message that is acknowledged by the floor acknowledgement message. The message type field is coded as specified in sub-clause 8.2.3.14 of TS 3GPP 24.380. The track info field is included when the MCPTT call (ambient listening call) involves a non-controlling MCPTT function. The coding of the track info field is described in sub-clause 8.2.3.13 of TS 3GPP 24.380. The location field is coded as described in sub-clause 8.2.3.21 of TS 3GPP 24.380 and contains the location information of the terminating user of the ambient listening call and the ambient listening call type is remote-initiated. The location field can be omitted when the location information of the terminating user is not allowed by the terminating user's MCPTT profile, or alternatively may be included with the location type field set to 0 (Not reported).

Receive connect message (R: Connect): Upon reception of the connect message, 1. if the MCPTT client (the MCPTT second electronic device (200)) accepts the incoming call the MCPTT client:

a. Sends the acknowledgement message (i.e. call control acknowledgement message) with Reason Code field set to 'Accepted';
b. Uses only media streams of a pre-established session which are indicated as used in the associated call session media streams field, if the connect message contains a media streams field;
c. Creates an instance of the 'floor participant state transition diagram for basic operation' as specified in sub-clause 6.2.4 TS 3GPP 24.380;
d. Includes the location information if the call is the ambient listening call and the ambient listening call type is remote-initiated; and
e. Enters the 'U: Pre-established session in use' state; or
2. Otherwise the MCPTT client:
a. Sends the acknowledgement message (call control acknowledgement message) with a reason code field set to 'Busy' or 'Not Accepted'; and
b. Remains in 'U: Pre-established session not in use' state.
Acknowledgement message (call control acknowledgement message) receives: Table. 2 shows the content of the acknowledgement message.

The aforementioned components will now be described in detail.
The processor 510 may include one or more processors or other processing devices that control the proposed function, process, and/or method. Operation of the UE 500 may be implemented by the processor 510.
The transceiver 520 may be connected to the processor 510 and transmit and/or receive a signal. In addition, the transceiver 520 may receive the signal through a wireless channel and output the signal to the processor 510. The transceiver 520 may transmit the signal output from the processor 510 through the wireless channel.
The memory 530 may store the control information or the data included in a signal obtained by the UE 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.
FIG. 6 schematically illustrates a core network entity according to embodiments of the present disclosure

TABLE 2

| 0 | | | | | | | | | | 1 | | | | | | | | | | 2 | | | | | | | | | | 3 | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V = 2 | | P | | | subtype | | | | | | PT = APP = 204 | | | | | | | | | | | | | | Length | | | | | | |
| SSRC of floor participant | | | | | | | | | | | | | | | | | | | | | | | | | | | | | | | |
| Name = MCPC | | | | | | | | | | | | | | | | | | | | | | | | | | | | | | | |
| Reason code field | | | | | | | | | | | | | | | | | | | | | | | | | | | | | | | |
| Location field | | | | | | | | | | | | | | | | | | | | | | | | | | | | | | | |

With the exception of the three first 32-bit words, the order of the fields is irrelevant. The subtype shall be coded according to table 8.3.2-1 of TS 3GPP 24.380. The length shall be coded as specified in sub-clause 8.1.2 of TS 3GPP 24.380. The SSRC field shall carry the SSRC of the floor participant. The SSRC field shall be coded as specified in IETF RFC 3550. The Reason Code field is coded as described in sub-clause 8.3.3.8 of TS 3GPP 24.380. The Location field is coded as described in sub-clause 8.2.3.21 of TS 3GPP 24.380 and contains the location information of the terminating user of the ambient listening call and the ambient listening call type is remote-initiated. This field can be omitted when location information of the terminating user is not allowed by the terminating user's MCPTT profile, or alternatively may be included with the location type field set to 0 (Not reported).
In an embodiment, the procedures described in the above embodiments for sharing the location information can be applied for any other applicable services and are not limited to only MCPTT service.
The embodiments disclosed herein can be implemented using at least one hardware device and performing network management functions to control the elements.
FIG. 5 is a diagram illustrating a UE according to an embodiment of the present disclosure
Referring to the FIG. 5, the UE 500 may include a processor 510, a transceiver 520 and a memory 530. However, all of the illustrated components are not essential. The UE 500 may be implemented by more or less components than those illustrated in the FIG. 5. In addition, the processor 510 and the transceiver 520 and the memory 530 may be implemented as a single chip according to another embodiment. In various embodiments of the disclosure, the UE 500 may be understood as the MCPTT first electronic device 100 or the MCPTT second electronic device 200.

Referring to the FIG. 6, the core network entity 600 may include a processor 610, a transceiver 620 and a memory 630. However, all of the illustrated components are not essential. The core network entity 600 may be implemented by more or less components than those illustrated in FIG. 6. In addition, the processor 610 and the transceiver 620 and the memory 630 may be implemented as a single chip according to another embodiment. In various embodiments of the disclosure, the core network entity 600 may be understood as the MCPTT server 300.
The aforementioned components will now be described in detail.
The transceiver 620 may provide an interface for performing communication with other devices in a network. That is, the transceiver 620 may convert a bitstream transmitted from the core network entity 600 to other devices to a physical signal and covert a physical signal received from other devices to a bitstream. That is, the transceiver 620 may transmit and receive a signal. The transceiver 620 may be referred to as modem, transmitter, receiver, communication unit and communication module. The transceiver 620 may enable the core network entity 600 to communicate with other devices or system through backhaul connection or other connection method.
The memory 630 may store a basic program, an application program, configuration information for an operation of the core network entity 600. The memory 630 may include volatile memory, non-volatile memory and a combination of the volatile memory and the non-volatile memory. The memory 630 may provide data according to a request from the processor 610.
The processor 610 may control overall operations of the core network entity 600. For example, the processor 610 may transmit and receive a signal through the transceiver

620. The processor 610 may include at least one processor. The processor 610 may control the core network entity 600 to perform operations according to embodiments of the present disclosure.

According to an embodiment of the disclosure, a method for sharing location information in a remote ambient call of a Mission-Critical Push-To-Talk (MCPTT) service, comprises determining, by an MCPTT server (300), that the remote ambient call is established between an MCPTT first electronic device (100) and an MCPTT second electronic device (200). In the embodiment, the method comprises sending, by the MCPTT server (300), a floor grant message to the MCPTT second electronic device (200) wherein the floor grant message includes a mandatory acknowledgment required indication set for the MCPTT second electronic device (200) to share the location information of the MCPTT second electronic device (200) with the MCPTT first electronic device (100). In the embodiment, the method comprises receiving, by the MCPTT server (300), a floor grant acknowledgement message with the location information of the MCPTT second electronic device (200) and sharing, by the MCPTT server (300), the location information of the MCPTT second electronic device (200) with the MCPTT first electronic device (100) in a floor taken message.

According to an embodiment, the method further comprises receiving, by the MCPTT server (300), a media transmission from the MCPTT second electronic device (200) and sending, by the MCPTT server (300), the received media transmission to the MCPTT first electronic device (100).

According to an embodiment, determining, by the MCPTT server (300), that the remote ambient call is established between the MCPTT first electronic device (100) and the MCPTT second electronic device (200), comprises: receiving, by the MCPTT server (300), a remote ambient listening call request from the MCPTT first electronic device (100) to initiate a remotely initiated ambient listening call, determining, by the MCPTT server (300), whether authentication of a user of the MCPTT first electronic device (100) for the remotely initiated ambient listening call is successful, and performing, by the MCPTT server (300), one of: sending a failure response to the MCPTT first electronic device (100) in response to determining that the authentication of the user of the MCPTT first electronic device (100) for the remotely initiated ambient listening call is not successful, and sending the remote ambient listening call request to the MCPTT second electronic device (200) to establish the remote ambient call between the MCPTT first electronic device (100) and the MCPTT second electronic device (200).

According to an embodiment, the floor grant message comprises at least one of a timer value for which the MCPTT second electronic device (200) is allowed to transmit in a duration field, a granted level of priority in a floor priority field, a track info field, a floor indicator field, and a first bit in a subtype of the floor grant message is set to one when a call is the remotely initiated ambient listening call.

According to an embodiment, the track info field stores a state transition diagram for general floor control operation.

According to an embodiment, the floor indicator field have appropriate indications when a group call is one of a broadcast group call, a system call, an emergency call, an imminent peril call, or a temporary group session.

According to an embodiment, the MCPTT server (300) initiates a floor granted timer when the floor grant message is in a queue for the MCPTT second electronic device (200) for which the floor is granted and sets a floor granted counter value to one.

According to an embodiment, the MCPTT server (300) sends the floor taken message to the MCPTT first electronic device (100).

According to an embodiment, the MCPTT server (300) initiates an end of RTP media timer for the MCPTT second electronic device (200) for which the floor is granted.

According to an embodiment, the floor grant acknowledgement message comprises at least one of a source field, a message type field, a track info field and a location field.

According to an embodiment, the message type field is set to one, the source field is set to zero, and add the location information of the MCPTT second electronic device (200) in the location field when a call is the remotely initiated ambient listening call and an MCPTT profile of the MCPTT second electronic device (200) allows to send the location information of the MCPTT second electronic device (200) with the MCPTT first electronic device (100). In the embodiment, the first bit in the subtype of the received floor grant message is set to one.

According to an embodiment, the MCPTT second electronic device (200) is configured to receive the floor grant message from the MCPTT server (300), wherein the floor grant message includes mandatory acknowledgment required indication, send the floor grant acknowledgement message with the location information of the MCPTT second electronic device (200) to the MCPTT server (300), provide a floor grant notification and terminate the end of RTP media timer, and the floor granted timer.

According to an embodiment, the method comprises receiving, by the MCPTT server (300), the remote ambient listening call request from the MCPTT first electronic device (100) to initiate the remotely initiated ambient listening call, determining, by the MCPTT server (300), that authentication of the user of the MCPTT first electronic device (100) for the remotely initiated ambient listening call is successful, sending, by the MCPTT server (300), the remote ambient listening call request to the MCPTT second electronic device (200) to establish the remote ambient call between the MCPTT first electronic device (100) and the MCPTT second electronic device (200), receiving, by the MCPTT server (300), the location information of the MCPTT second electronic device (200) in a connect acknowledge message from the MCPTT second electronic device (200), wherein the location is field is added in the connect acknowledge message and sharing, by the MCPTT server (300), the location information of the MCPTT second electronic device (200) to the MCPTT first electronic device (100).

According to an embodiment of the disclosure, a Mission-Critical Push-To-Talk (MCPTT) server (300) for sharing location information in a remote ambient call of a MCPTT service, comprises a memory (310), a processor (320) and a floor controller (340), operably connected to the memory (310) and the processor (320) is configured to determine that the remote ambient call is established between an MCPTT first electronic device (100) and an MCPTT second electronic device (200), send a floor grant message to the MCPTT second electronic device (200) wherein the floor grant message includes a mandatory acknowledgment required indication set for the MCPTT second electronic device (200) to share the location information of the MCPTT second electronic device (200) with the MCPTT first electronic device (100), receive a floor grant acknowledgement message with the location information of the MCPTT second electronic device (200) and share the location information of the MCPTT second electronic device (200) with the MCPTT first electronic device (100) in a floor taken message.

According to an embodiment, the processor (320) is further configured to receive a media transmission from the MCPTT second electronic device (200) and send the received media transmission to the MCPTT first electronic device (100).

According to an embodiment, to determine that the remote ambient call is established between the MCPTT first electronic device (100) and the MCPTT second electronic device (200), comprises to receive a remote ambient listening call request from the MCPTT first electronic device (100) to initiate a remotely initiated ambient listening call, to determine whether authentication of a user of the MCPTT first electronic device (100) for the remotely initiated ambient listening call is successful; and to perform one of: send a failure response to the MCPTT first electronic device (100) in response to determining that the authentication of the user of the MCPTT first electronic device (100) for the remotely initiated ambient listening call is not successful, and send the remote ambient listening call request to the MCPTT second electronic device (200) to establish the remote ambient call between the MCPTT first electronic device (100) and the MCPTT second electronic device (200).

According to an embodiment, the floor grant message comprises at least one of a timer value for which the MCPTT second electronic device (200) is allowed to transmit in a duration field, a granted level of priority in a floor priority field, a track info field, a floor indicator field, and a first bit in a subtype of the floor grant message is set to one when a call is the remotely initiated ambient listening call.

According to an embodiment, the track info field stores a state transition diagram for general floor control operation.

According to an embodiment, the floor indicator field have appropriate indications when a group call is one of a broadcast group call, a system call, an emergency call, an imminent peril call, or a temporary group session.

According to an embodiment, the MCPTT server (300) initiates a floor granted timer when the floor grant message is in a queue for the MCPTT second electronic device (200) for which the floor is granted and configuring a floor granted counter value to one.

According to an embodiment, the MCPTT server (300) sends the floor taken message to the MCPTT first electronic device (100).

According to an embodiment, the MCPTT server (300) initiates an end of RTP media timer for the MCPTT second electronic device (200) for which the floor is granted.

According to an embodiment, the floor grant acknowledgement message comprises at least one of a source field, a message type field, a track info field and a location field.

According to an embodiment, the processor (320) is configured to receive the remote ambient listening call request from the MCPTT first electronic device (100) to initiate the remotely initiated ambient listening call, determine that authentication of the user of the MCPTT first electronic device (100) for the remotely initiated ambient listening call is successful, send the remote ambient listening call request to the MCPTT second electronic device (200) to establish the remote ambient call between the MCPTT first electronic device (100) and the MCPTT second electronic device (200), receive the location information of the MCPTT second electronic device (200) in a connect acknowledge message from the MCPTT second electronic device (200), wherein the location is field is added in the connect acknowledge message and share the location information of the MCPTT second electronic device (200) to the MCPTT first electronic device (100).

According to an embodiment of the disclosure, a second electronic device (200) for sharing location information in a remote ambient call of a Mission-Critical Push-To-Talk (MCPTT) service, comprises a memory (210), a processor (220), and a floor controller (240), operably connected to the memory (210) and the processor (220), configured to receive a floor grant message from an MCPTT server (300), wherein the floor grant message includes mandatory acknowledgment required indication, send a floor grant acknowledgement message with the location information of the MCPTT second electronic device (200) to the MCPTT server (300), provide a floor grant notification, provide a notification to a user indicating a type of call when a floor indicator field is included and a B-bit is set to one, store an indication that a participant is overriding without revoke when a G-bit in the floor indicator is set to one, and terminate an end of RTP media timer and a floor granted timer.

According to an embodiment, the floor grant acknowledgement message comprises at least one of a source field, a message type field, a track info field and a location field.

According to an embodiment, the message type field is set to one, the source field is set to zero, and add the location information of the MCPTT second electronic device (200) in the location field when a call is the remotely initiated ambient listening call and an MCPTT profile of the MCPTT second electronic device (200) allows to send the location information of the MCPTT second electronic device (200) with the MCPTT first electronic device (100), wherein the first bit in the subtype of the floor grant message is set to one.

According to an embodiment of the disclosure, a system (1000) for sharing location information in a remote ambient call of a Mission-Critical Push-To-Talk (MCPTT) service, comprises an MCPTT server (300) and the MCPTT second electronic device (200), wherein the MCPTT server (300) is configured to determine that the remote ambient call is established between a MCPTT first electronic device (100) and a MCPTT second electronic device (200), send a floor grant message to the MCPTT second electronic device (200) wherein the floor grant message includes a mandatory acknowledgment required indication set for the MCPTT second electronic device (200) to share the location information of the MCPTT second electronic device (200) with the MCPTT first electronic device (100), receive a floor grant acknowledgement message with the location information of the MCPTT second electronic device (200), and share the location information of the MCPTT second electronic device (200) with the MCPTT first electronic device (100) in the remote ambient call of the MCPTT service using a floor taken message and wherein the MCPTT second electronic device (200) is configured to receive a floor grant message from a MCPTT server (300) wherein the floor grant message includes a mandatory acknowledgment required indication, send a floor grant acknowledgement message with the location information of the MCPTT second electronic device (200) to the MCPTT server (300), provide a floor grant notification, provide a notification to a user indicating a type of call when a floor indicator field is included and a B-bit is set to one, store an indication that a participant is overriding without revoke when a G-bit in the floor indicator is set to one, and terminate an end of RTP media timer and a floor granted timer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a server in a wireless communication system, the method comprising:

identifying, whether a remote ambient listening call is requested from a first device to a second device;

transmitting, to the second device, a floor granted message including an acknowledgment required indication indicating whether an Acknowledgment is required based on the identification that the remote ambient listening call has been requested;

receiving, from the second device, a floor acknowledgement message, wherein the floor acknowledgment message comprises location information of the second device based on profile information of the second device allowing sending the location information of the second device; and transmitting, to the first device, a floor taken message including the location information of the second device.

2. The method of claim 1, further comprising:

receiving, from the second device, media; and transmitting, to the first device, the received media.

3. The method of claim 1, wherein identifying whether the remote ambient listening call is requested comprising:

receiving, from the first device, a remote ambient listening call request;

identifying whether an authentication of the first device for the remote ambient listening call is successful;

transmitting, to the second device, the remote ambient listening call request; and receiving, from the second device, a remote ambient listening call response.

4. The method of claim 1, wherein the floor granted message comprises at least one of a duration field including a timer value for which the second device is allowed to transmit, a floor priority field including a granted level of priority, a track info field, a floor indicator field, or information about a subtype of the floor granted message, and wherein the information about the subtype includes a first bit set to one.

5. The method of claim 1, wherein the floor acknowledgement message comprises at least one of a message type field which is set to 1, a source field which is set to 0, or a location field including the location information of the second device.

6. The method of claim 5, wherein the location field comprises at least one of a location field ID, a location length, or a location value.

7. The method of claim 1, wherein the floor taken message further comprises at least one of information about an identity of a granted user, or information about a functional alias of the granted user.

8. A server in a wireless communication system, the server comprising:

a communicator; and at least one processor coupled to the communicator and configured to:

identify, whether a remote ambient listening call is requested from a first device to a second device;

control the communicator to transmit, to the second device, a floor granted message including an acknowledgment required indication indicating whether an Acknowledgment is required based on the identification that the remote ambient listening call has been requested;

control the communicator to receive, from the second device, a floor acknowledgement message, wherein the floor acknowledgement message includes location information of the second device based on profile information of the second device allowing sending the location information of the second device; and control the communicator to transmit, to the first device, a floor taken message including the location information of the second device.

9. The server of claim 8, wherein the at least one processor is further configured to:

control the communicator to receive, from the second device, a media; and control the communicator to transmit, to the first device, the received media.

10. The server of claim 8, wherein the at least one processor is further configured to:

control the communicator to receive, from the first device, a remote ambient listening call request;

identify whether an authentication of the first device for the remote ambient listening call is successful;

control the communicator to transmit, to the second device, the remote ambient listening call request; and control the communicator to receive, from the second device, a remote ambient listening call response.

11. The server of claim 8, wherein the floor granted message comprises at least one of a duration field including a timer value for which the second device is allowed to transmit, a floor priority field including a granted level of priority, a track info field, a floor indicator field, or information about a subtype of the floor granted message, and wherein the information about the subtype includes a first bit set to one.

12. The server of claim 8, wherein the floor acknowledgement message comprises at least one of a message type field which is set to 1, a source field which is set to 0, or a location field including the location information of the second device.

13. The server of claim 12, wherein the location field comprises at least one of a location field ID, a location length, or a location value.

14. The server of claim 8, wherein the floor taken message further comprises at least one of information about an identity of a granted user, or information about a functional alias of the granted user.

* * * * *